United States Patent [19]

Brotz

[11] Patent Number: 4,976,907
[45] Date of Patent: Dec. 11, 1990

[54] PELLETIZING ROLL AND METHOD

[76] Inventor: Gregory R. Brotz, P.O. Box 1322, Sheboygan, Wis. 53081

[21] Appl. No.: 408,927

[22] Filed: Sep. 18, 1989

[51] Int. Cl.⁵ .......................... B29B 9/00; B29B 9/02
[52] U.S. Cl. .................... 264/140; 264/117; 264/118; 425/201; 425/202; 425/310
[58] Field of Search ............... 264/117, 118, 140, 141; 425/201, 202, 306, 307, 310; 241/85

[56] References Cited

U.S. PATENT DOCUMENTS

| 271,589 | 2/1883 | Anderson | 241/85 |
|---|---|---|---|
| 909,133 | 1/1909 | Baur | 241/85 |
| 1,327,254 | 1/1920 | Remmers | 241/85 |
| 2,833,481 | 5/1958 | Perks | 241/85 |
| 3,287,480 | 11/1966 | Wechsler et al. | 264/118 |
| 3,592,129 | 7/1971 | List | 425/201 |
| 3,627,865 | 12/1971 | Wittwer et al. | 264/118 |

FOREIGN PATENT DOCUMENTS

| 0670323 | 6/1979 | U.S.S.R. | 264/118 |
|---|---|---|---|
| 2037218 | 7/1980 | United Kingdom | 264/142 |

*Primary Examiner*—Mary Lynn Fertig Theisen
*Attorney, Agent, or Firm*—William Nitkin

[57] ABSTRACT

An improved roll and method for mixing, shearing and pelletizing materials utilizing a pair of conical-shaped rollers positioned adjacent to one another with one of the rollers having a plurality of perforations in its narrow end and the other of the rollers, in one embodiment, heated, with material positioned in the nip at the wider end of the rollers moving during operation of the rollers to the narrow end where the material is forced through the perforations and cutt off inside the roller forming pellets.

6 Claims, 3 Drawing Sheets

PELLETIZING ROLL AND METHOD

BACKGROUND OF THE INVENTION

1. Field of the Invention

The structure of this invention resides in the area of pelletizing rolls and more particularly relates to a device for the continuous melting, shearing and pelletizing of material.

2. Description of the Prior Art

Conventional roll mills are well known in the art for mixing amounts of dry blended materials which are delivered into the nip of the rollers. Such roll mills can be heated to melt resins in the mixture and blend the mass of materials to form a sheet around the roll with a buildup of material forming over the nip where great forces shear the materials together to form a homogeneous mass. This type of mixing is highly desirable and is often superior to other forms of material mixing. The sheets that come off the rollers can be cut by a knife and then this material can be passed into step mills, crushers or other devices to particulate the material. Also known in the prior art are pellet mills which can have a ring die where materials are fed inside the ring, usually in the form of raw materials such as powder mixtures to be melted and blended together, and the die can rotate with the material, which is held against the inner sides of the ring by centrifugal force, forced between the holes in the ring by two internal rollers. The material forced through the holes is then cut away from the outside of the ring by a knife positioned against the circumference of the ring thus forming pellets whose dimensions depend upon the speed of the roller and the distance of the pellets' extrusion before the extruded pellet material strikes the knife. Pellet mills are often continuous operation devices. While pellet mills can make pellets out of material, they do not have mixing or shearing capabilities that roll mills have. Roll mills, on the other hand, as they are currently utilized, mix and shear but do not make pellets nor do they process material continuously as a pellet mill can. One example of a structure that acts as a pelletizer with some of the features of a roll mill but which does not mix or shear the material is disclosed in U.S. Pat. No. 2,833,481 to Perks which is a method of breaking compressed acetylene black. Disclosed in this patent is the method wherein lumps of material in a hopper to be broken up are fed to rolls counterrotating against one another and which rolls have therein a screen surface through which the pellets are broken and which pellets can fall inside the rolls. In U.S. Pat. No. 271,589 to Anderson, it is disclosed that wheels can have a surface upon which a product is dispensed which wheels move against one another, forcing portions of the product through slots. Internal cutters then cut away the product from inside the wheel to create smaller particles thereof. In the same vein, in U.S. Pat. No. 1,327,254 to Remmers, peelings are obtained through apertures in the sides of rotating foraminous cylinders which cylinders are disposed at an angle so that the peelings pass out from one end of the cylinder. Also in U.S. Pat. No. 909,133 to Baur, cylinders are provided with apertures therein which apertures are smaller on the exterior of the cylinder and widen to the interior of the cylinder for receiving materials to be crushed and mixed where such material is rolled, kneaded and foreign substances crushed, the walls of the cylinders having holes through which the material is pressed and the material is thereby processed which device is particularly suited for crushing and mixing loam and the like.

SUMMARY OF THE INVENTION

It is an object of this invention to provide a device which combines the advantages of a heated shearing mill and a pelletizing mill in one structure. To this end is provided two adjacent conical rolling mills with a plurality of perforations at the narrow end of one of the rollers. The material to be processed is placed on the uppermost wider ends of the rollers which can be heated and the material passes therearound and is mixed by the shearing, melting and blending effects of the rollers. The material passes down the rollers initially by the force of gravity and then by force of the volume of material coming from the broader end to the narrower end of the conical shaped rollers. Such apparatus can take dry or preplasticated materials which would be fed onto the wider end of the rollers, and in one embodiment having one roller heated and the other unheated, the unheated roller having a plurality of perforations at its narrow end and both rollers being tapered. The materials are placed on the wider ends of the rollers at the end opposite the perforations. The roll mixing and heating process takes place for the continuous melting and shearing of the materials which will advance down the nip between the rollers because of the higher level and larger volumes of materials located at the wider end of the rollers and will advance to the smaller ends where the pressure of the rollers will start forcing the mixed materials already plasticated or melted through the perforations to inside the unheated roller where a stationary knife can be fixed on the shaft such knife extending against the inside of the roller which knife will cut off the materials as they protrude through the perforations. The materials will then fall rearward pulled by gravity out the openings at the large end of the roller, the bottom of which roller being angled downward. Viscous materials will always tend to flow toward the area of least shear which in this case is toward the smaller diameter end of the rollers. Also the larger volume of material at the wider end of the rollers will force the materials on the roller toward the smaller end as it is masticated, sheared and mixed. The material will melt and will usually become more dense as on any conventional rollers, but it will move toward the narrow end until it reaches the perforated section. The larger diameter portion of the rollers has a higher shear rate than the narrow end of the rollers. To assist in creating less shear at the narrow ends of the rollers to promote material flow to such narrow ends, the nip and space between the rollers can be wider apart at the narrow ends than at the wider ends of the rollers. Once the material is squeezed through the perforations, it is extruded into the interior of the roll where it is cut off as it passes by the stationary knife edge and as the system is built at an angle, the pellets by gravity will fall back down the hollow roller with the perforations at one end to the opposite end where there are openings that will allow the pellets to exit. The stationary knife helps keep the interior surface of the roller clean. Cool air can be sprayed into the perforated roller to help solidify the pellets and this cool air can also include a spray coating to coat the pellets if desired in the process.

The rollers of this invention would be particularly useful in the synthesizing of aluminum-rich glasses which heretofore have been formed by melt spinning techniques. Such aluminum-rich lightweight glassy alloys can be utilized in aerospace applications, but they unfortunately have been brittle in nature. New research has yielded more flexible aluminum-rich glasses because they contain a higher proportion of aluminum than previous metallic glasses. These new alloys may have as much as 90% aluminum and could also include iron and cerium. The high temperature pelletizing rollers of this invention are ideal for the production of such metallic glasses and other similar alloys.

DESCRIPTION OF THE PREFERRED EMBODIMENT(S)

Figure 1:
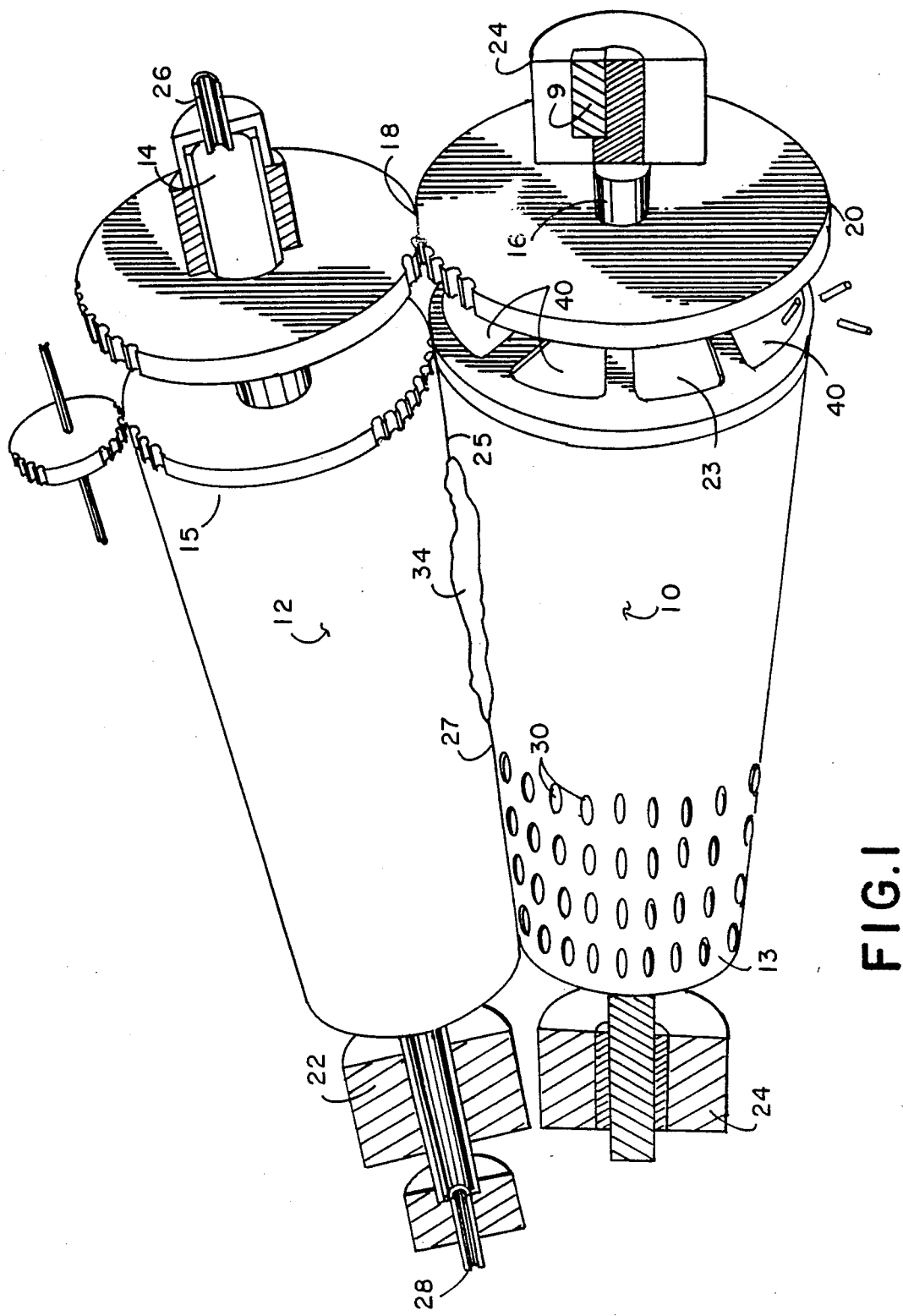
FIG. 1 illustrates a view of the shearing, mixing and pelletizing rolls of this invention with portions cut away to illustrate the interiors thereof and the drive gear system.
Figure 2:
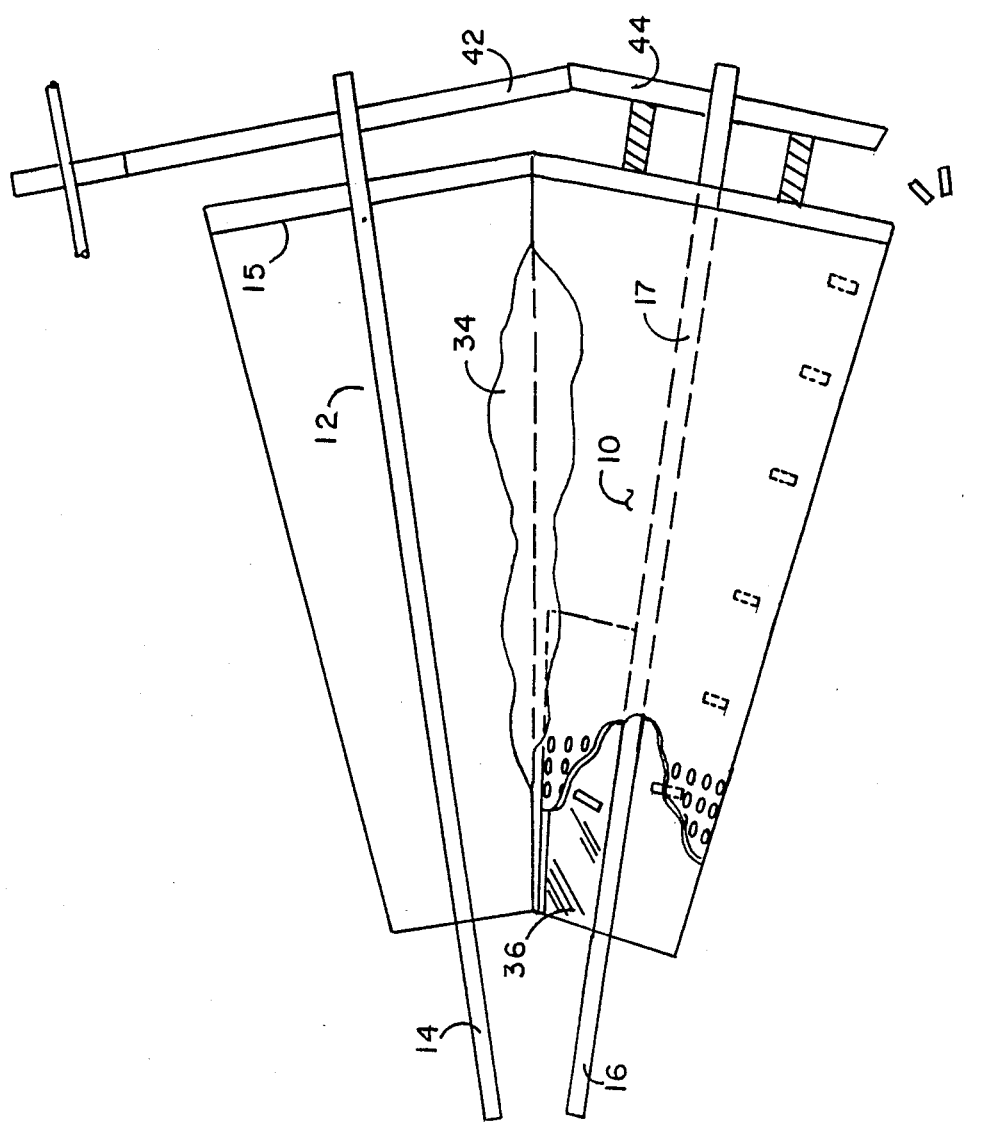
FIG. 2 illustrates a top plan cutaway view of the first and second conical rollers.
Figure 3:
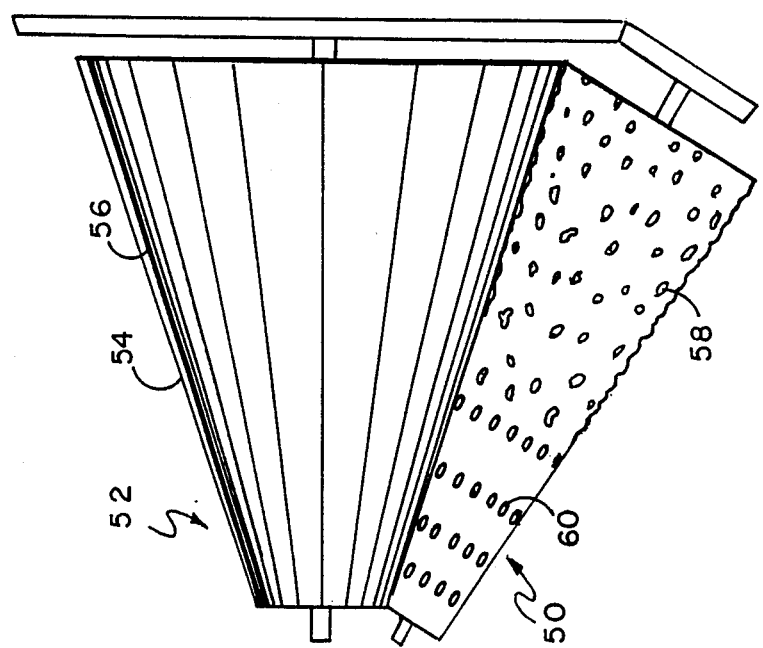
FIG. 3 illustrates rollers of different diameters and pitches with the roller having perforations having a rougher surface than the other roller.

FIG. 1 illustrates the basic structure of the device of this invention showing first roller 12 which is conical in shape with first gear 18 near wide end 15 of roller 12 having first shaft 14 centrally extending through roller 12, first shaft 14 being retained by typical shaft retention bushing 22 and the like. In conical roller 12 is provided heating means which can include steam, provided through steam inlet 26 which would direct hot steam inside first conical roller 12 and such steam would then pass out through steam outlet 28. Other means for heating the roller could be used such as by electrical means. First conical roller 12 can also be heated by induction heating where the roller is made of a material that will heat when an alternating field is placed near the roller so as to pass through it. Both rollers can also be heated and as long as there is a temperature differential, the material will usually stick to the hotter roller. Second conical roller 10 is positioned with its facing side adjacent to first conical roller 12 in contact therewith so that the narrow end 13 of the second conical roller 10 is adjacent to the narrow end of first conical roller 12. Second conical roller 10 also has interconnected therewith second gear 20 intermeshed with first gear 18 so that the two conical rollers will counterrotate in close proximity or contact with one another. The sheet thickness forming around the rollers equals the width of the space between the rollers at the nip. Other gearing arrangements are possible such as the rollers being differentially geared with one roller larger than the other, such as seen in FIG. 3, and one roller rotating at a faster speed than the other which arrangement can be beneficial for intensive mixing. In FIG. 2 first gear 42 is larger than second gear 44 so that roller 10 will rotate at a faster speed than roller 12. Second shaft 16 passes through second conical roller 10 and can include means to retain second shaft 16 in a fixed non-rotating position such as second bushing 24 and key 9 seen in FIG. 1. Second shaft 16 is positioned in alignment with first shaft 14 so that there is a desired space either with full or partial contact between second conical roller 10 and first conical roller 12. In FIG. 1 first conical roller 12 will rotate around second shaft 16 as driven by second gear 20. End 23 of second conical roller 10 has a series of openings 40. Second conical roller 10 at its narrow end 13 has a series of perforations 30 of a desired size for the pelletizing process. Inside second conical roller 10, as seen in FIG. 2, is stationary second shaft 16 which passes through the center thereof and around which second conical roller 10 rotates. Also mounted on second shaft 16 is fixed knife 36 seen in FIG. 2 which, as conical roller 10 rotates, passes directly under the bottom of perforations 30 in the face of second conical roller 10 and acts to cut off materials 34 being squeezed through perforations 30. Materials are placed on the wider portions 15 and 17 of rollers 12 and 10, respectively, at position 25 and the process of heating, rolling, mixing and shearing takes place as the rollers rotate. The materials then advance down nip 27, as seen in FIG. 1, where they are mixed until they come to the point where they reach perforations 30 where they are forced to the inside of conical second roller 10 through perforations 30 where they are cut off by stationary knife 36 seen in FIG. 2 as second roller 10 rotates and the pellets then fall back by gravity out openings 40 at open end 23 of second conical roller 10. It is desirable for knife 36 to be upwardly positioned so the pellets will fall to the bottom of the inside of the roller where they will tumble and fall out the end of the roller. In some embodiments both rollers can have perforations at various points in their surfaces and further the rollers can be heated in various zones on their surfaces. The tumbling of the pellets in air inside the roller helps the pellets cool and prevents them from fusing together or fusing with material as the material comes through the perforations. In this way advantageous mixing, shearing, heating, melting, fusing and pelletizing all take place on the same rollers with the conical structure causing movement of the material being worked upon from the wide end of the rollers to the narrow end of the rollers where the perforations for the pelletizing are located.

As mentioned above, the rollers can be of different sizes and side pitches as seen in FIG. 3 where first first roller 52 is shown larger than second roller 50. Side 54 of first roller 52 is at a greater pitch than the pitch of second roller 50. Second roller 50 has perforations 60 at its narrow end. Also illustrated is non-smooth surface 58 which is rough, such as having an acid-etched matte finish while the surface 56 of first roller 52 is smooth and highly polished. When rough surfaced rollers are used, they can be in actual contact and the material will be forced through the nip at the lower portions of the rough surface while the upper portions of the rough surfaces of each roller generally contact one another.

Although the present invention has been described with reference to particular embodiments, it will be apparent to those skilled in the art that variations and modifications can be substituted therefor without departing from the principles and spirit of the invention.

I claim:

1. An improved roller for mixing, shearing and pelletizing materials comprising:
    first conical-shaped roller having a wide end and a narrow end with heating means included therein;
    a second conical shaped hollow roller having a wide end and a narrow end adjacent to said first roller with the narrow ends of each of said conical-shaped first and second rollers adjacent to one another and the wide ends of said conical shaped rollers adjacent to one another;
    means to counter-rotate said first and second rollers;
    a plurality of perforations defined in the narrow end of said second conical shaped hollow roller;

cutting means mounted within said second conical-shaped hollow roller adapted to cut off materials into pellets that pass through said perforations; and means for said pellets to exit from said second conical-shaped hollow roller.

2. The device of claim 1 further including means to rotate said first and second conical shaped rollers at differing speeds.

3. The device of claim 1 further including means to heat said second conical-shaped roller.

4. A method for mixing, shearing and pelletizing material comprising the steps of:

depositing material in the nip of the wider ends of a pair of counter-rotating conically shaped rollers with at least one of said rollers being hollow having their narrow ends adjacent to one another and their wider ends adjacent to one another;

rotating said rollers forcing said material to be mixed and sheared;

moving said material by the action of said conical-shaped rollers and gravity from the wide end of said rollers to the narrow end of said rollers;

providing a plurality of perforations in the narrow end of said hollow roller;

forcing said material when it reaches the narrow end of said rollers through said perforations in one of said rollers to the interior of said roller;

cutting said materials that pass through said perforations inside said roller into pellets; and removing said pellets from said roller.

5. The method of claim 4 further including the step of heating said roller that does not have perforations therein.

6. The method of claim 5 further including the step of rotating said rollers at differing speeds.

* * * * *